July 8, 1952 J. C. WHELAN 2,602,879
PIVOTAL MOUNTING ARRANGEMENT WITH CLUTCH
FOR FLASH LAMPS AND THE LIKE
Filed Aug. 6, 1947 3 Sheets-Sheet 1

INVENTOR.
JOHN C. WHELAN
BY
ATTORNEYS

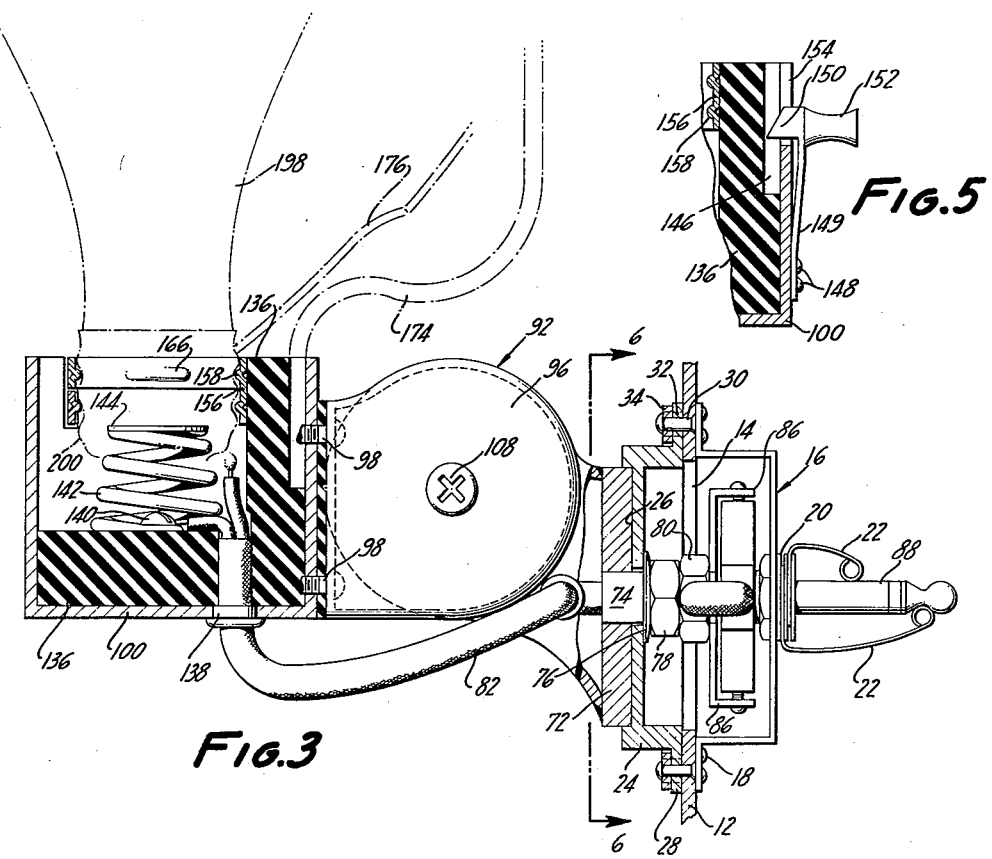
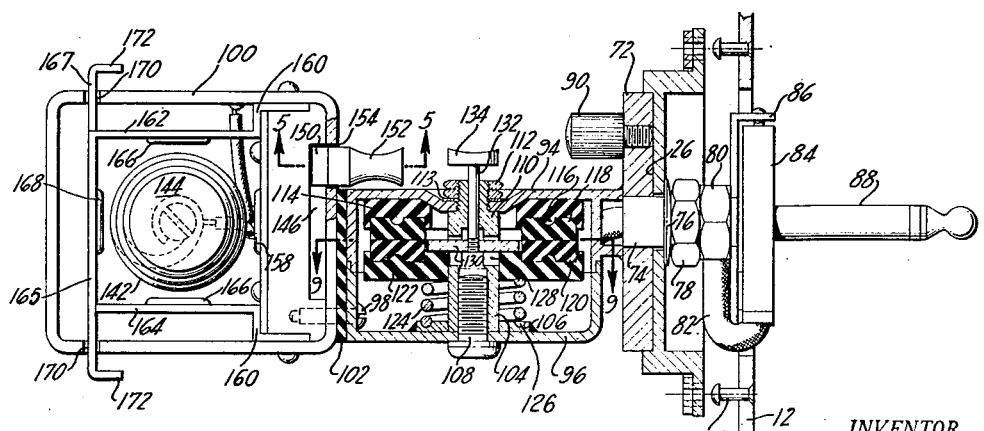

July 8, 1952    J. C. WHELAN    2,602,879
PIVOTAL MOUNTING ARRANGEMENT WITH CLUTCH
FOR FLASH LAMPS AND THE LIKE
Filed Aug. 6, 1947    3 Sheets-Sheet 3

INVENTOR.
JOHN C. WHELAN
BY Naylor and Lassagn
ATTORNEYS

Patented July 8, 1952

2,602,879

UNITED STATES PATENT OFFICE 2,602,879

PIVOTAL MOUNTING ARRANGEMENT WITH CLUTCH FOR FLASH LAMPS AND THE LIKE

John C. Whelan, Napa, Calif.

Application August 6, 1947, Serial No. 766,836

2 Claims. (Cl. 240—52)

This invention relates to photographic apparatus, and, more particularly, the invention embodies a pivotal mounting arrangement for a flash lamp socket.

It is well known in the art, as shown by the patent to Wildman 2,272,102, to utilize a photography system embodying a camera and one or more flash lamps remotely located from the camera, and uninterconnected therewith, said camera having associated with it a transmitter circuit adapted to send out a wave signal which is picked up by receiver circuits associated with the flash lamps to energize the lamps simultaneously with the actuation of the camera shutter. Due to the fact that each slave unit containing a flash lamp should be orientated so as to be aimed directly at that portion of the scene to be illuminated, and due, further, to the fact that the number of locations available for the setting or hanging of the slave unit may be at a minimum, it is advantageous to provide a pivotal mounting for the flash lamp. By means of a pivotal connection between the slave unit housing or case and the flash lamp, it is possible to first pre-set the slave unit in an available location, and then direct the flash lamp reflector at that portion of the scene to be illuminated, thus avoiding the necessity of canting or tilting the complete slave unit so as to get the flash lamp properly directed.

It is an object of the present invention to provide a novel mounting with which to secure a flash lamp socket to a support member, such as a slave unit housing or case above-mentioned, so that the socket will be capable of a universal pivoting action.

A further object of the invention is to provide a novel flash lamp release mechanism and attendant socket structure for the pivotal mounting embodied in the invention.

And yet a further object of the invention is to provide a flash lamp reflector with a directional sight so that the reflector may be accurately directed by appropriate movement of the elements of the pivotal mounting.

And still another object of the invention is to provide a novel locking ring to secure the mounting to its supporting case.

Other objects and advantages of the invention will be apparent from the following description taken in conjunction with the drawings forming part of this specification, and in which:

Fig. 3 is a view in elevation, partly in section, of the flash bulb mounting embodied in the invention;

Fig. 4 is a plan view, partly in section, of the flash bulb mounting shown in Fig. 3, illustrating the mounting disconnected from the supporting case;

Figure 6:
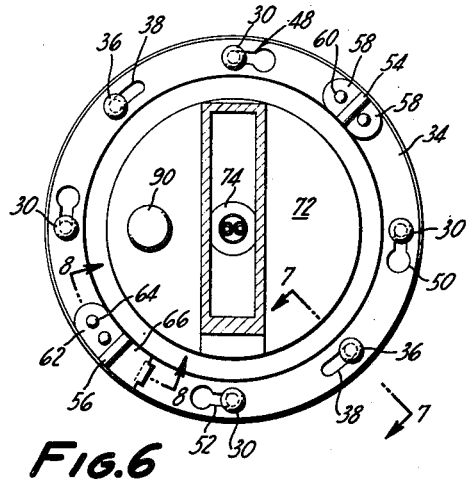
Figure 7:
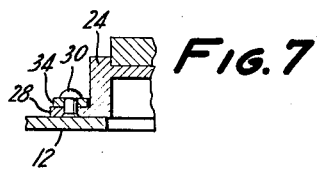
Figure 8:
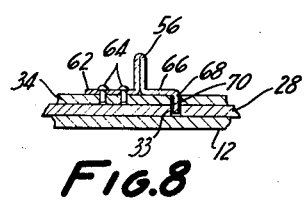
Figure 9:
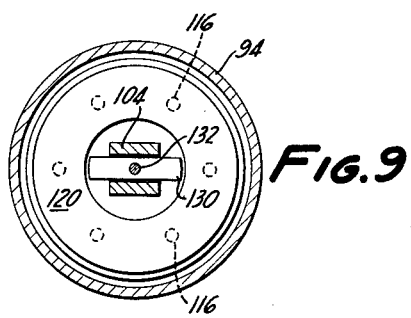
Figure 10:
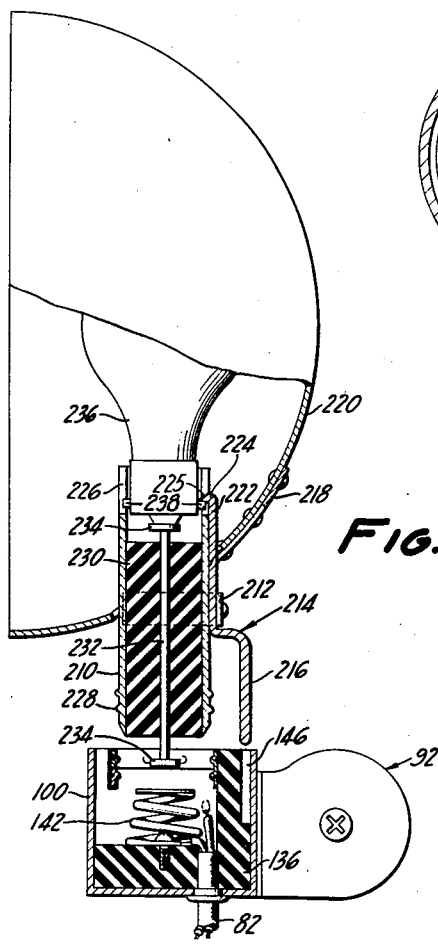
Figure 11:
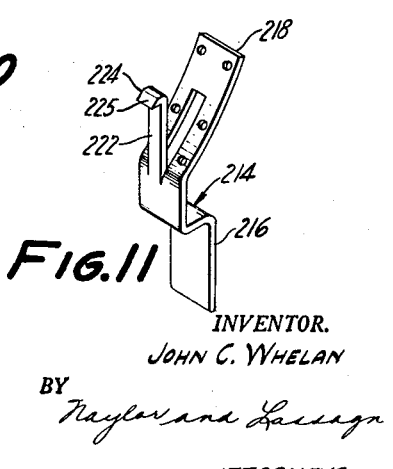

Fig. 5 is a view taken along lines 5—5 of Fig. 4;
Fig. 6 is a view taken along lines 6—6 of Fig. 3;
Fig. 7 is a view taken along lines 7—7 of Fig. 6;
Fig. 8 is a view taken along lines 8—8 of Fig. 6;
Fig. 9 is a view taken along lines 9—9 of Fig. 4;
Fig. 10 is a view in sectional elevation of a reflector and flash lamp socket arrangement adapting the primary socket for use with midget lamps; and Fig. 11 is a view in perspective of the reflector support bracket embodied in the lamp socket arrangement for midget lamps.

Figure 1:
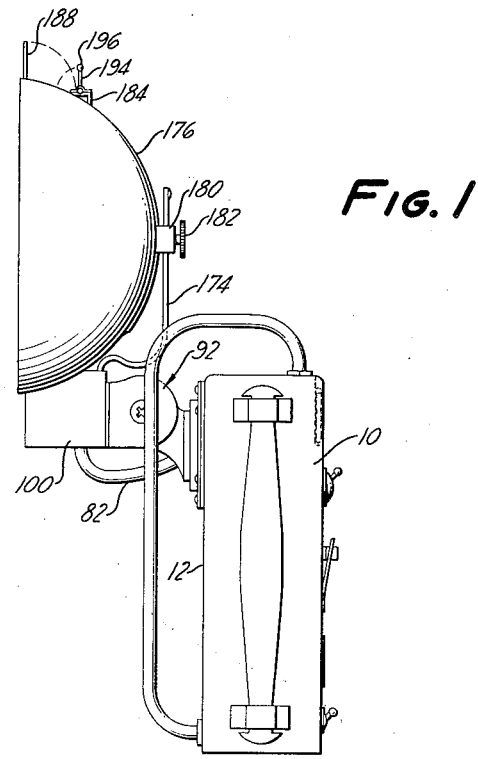
Fig. 1 is a view in elevation of a photographic unit embodying the invention.
Figure 2:
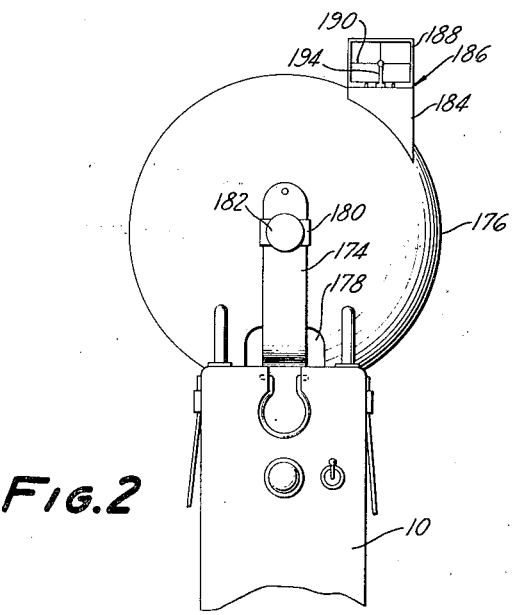
Fig. 2 is a partial view in side elevation of the unit of Fig. 1.

Referring to the drawings for more details of the invention, Fig. 1 shows a remotely controlled flash lamp unit adapted to be strategically located with respect to a scene to be photographed, and at a distance from the camera, said unit comprising a case 10 having in the front face 12 thereof an aperture 14. A phone-jack, indicated generally at 16, is secured to the inner surface of the face 12, as by rivets 18, and comprises a socket 20 carrying spring contacts 22. A mounting ring 24 having an inset face 26 and a flange 28 is adapted to be supported on the face 12 by means of a plurality of pins 30 carried by said face and adapted to be passed through a plurality of apertures 32 in the flange 28. The flange 28 is provided with an aperture 33 for a purpose hereinafter described.

A locking ring 34, secured to the flange 28 for limited pivotal movement with respect thereto by pins 36, carried by the flange and passed through diametrically opposed slots 38 in the ring, is further provided with a plurality of slots 48 having enlarged portions 50 for the reception of the heads of the pins 30 and having restricted portions 52 adapted to lockingly secure both the ring 34 and flange 28 to the face 12 upon a rotation of said ring to bring the head portions of the pins 30 over the restricted portions 52 of the slots 48. The ring 34 is also provided with a pair of upstanding rib members 54 and 56, said member 54 having flanges 58 secured to the ring 34 by rivets 60, and said rib member 56 having a flange 62, fixedly secured to the ring 34 by rivets 64, and a free flange 66 terminating in a downwardly bent portion, or detent 68. When the ring 34 is in the locking position of Fig. 6, the detent 68 is in engagement with the aperture 33 of flange 28 to prevent any relative movement of the ring with respect to the flange, while a movement of the ring to the unlocking position through the gripping media of the ribs 54 and 56 serves to raise the detent 68 from engagement with the aperture 33 to allow a free turning of the ring.

A disk 72, fixedly secured to a hollow shaft 74, is held in pressing engagement with the face 26 of the mounting ring 24 by a spring washer 76 secured against the mounting ring by a nut 78 carried on a threaded portion of the shaft 74. At the end of the shaft 74 there is carried a lock nut 80 having a lateral opening for the passage therethrough and into said shaft of an insulated cable 82, said cable issuing from the side of a flat plug 84 carried by oppositely disposed brackets 86 secured to the end of the nut 80. The cable makes contact within the plug with a plug stem 88 carried by said plug. When the disk 72 is rotated against the slight holding action caused by the engagement of the face 26 with said disk, the shaft 74, nut 78, nut 80, plug 84 and plug stem rotate therewith. As shown in Fig. 4, the same members are removable as a unit from the phone jack 16 when the locking ring 34 is rotated to its unlocking position. A set screw 90 carried by the disk 72 is provided to frictionally engage the mounting ring 26 and lock said disk to the mounting ring in any desired position.

A clutch case, indicated generally at 92, and comprising complementary case sections 94 and 96, has the section 94 thereof carried by the disk 72, while the section 96 has secured thereto by screws 98 of insulating material a lamp socket casing 100, there being a sheet of insulation material 102 between said section 96 and casing 100. The case sections 94 and 96 are secured together, so as to allow a ready relative rotation therebetween, by a square shaft 104 seated in a boss 106 carried by the case section 96, said case section 96 being secured to said shaft by a bolt 108 threadably engaged in the tapped end of said shaft, while said case section 94 is apertured to be sleeved over the threaded end of said shaft and to be held in wiping engagement with a shoulder 110 of said shaft by nuts 112 and a spring washer 113.

The case section 94 has secured thereto, as by a suitable bonding agent, a backing ring 114, preferably of fiber, or like material, having a plurality of spaced protuberances 116, and to the backing ring there is secured, as by bonding, a clutch face ring 118 of rubber, or material having a high coefficient of friction, said ring 118 having a plurality of spaced indentations complementary to the protuberances 116. A second clutch face ring 120 secured to a backing ring 122 is normally urged into tight engagement with the clutch face ring 118 by a spring 124 seated in an annular groove 126 in the boss 106, said backing ring 122 having a square central aperture for the sleeving of said ring on the square shaft 104 and for the locking of said ring to said shaft for rotation therewith and with the case section 96.

The shaft 104 has a transverse slot 128 in which there resides a cross arm 130, said arm having threadably engaged therewith a shaft 132 extending from the shaft 104 and terminating in a handle 134.

It will be clear that when the handle 134 is pushed inwardly, the cross arm 130 forces the clutch face ring 120 away from engagement with the clutch face ring 118 against the action of spring 124, whereupon the case section 96 may be rotated with respect to the case section 94 to variably position the lamp socket casing 100 about the longitudinal axis of shaft 104, while the rotatability of disk 72, upon the disengagement of the set screw 90, with respect to the face 26 of the mounting ring 24 allows for the movement of the lamp socket casing 100 about the axis of shaft 74. The lamp socket casing is thus capable of a universal pivoting action. When the handle 134 is released, the cross arm 130 is forced outwardly by the backing ring 122 under the action of spring 124 to allow the engagement of clutch rings 118 and 120 and the consequent locking together of the case sections 94 and 96.

The lamp socket casing is provided with insulation 136 having an aperture in alignment with an aperture 138 in the casing for the passage into said casing of the cable 82, said cable having one lead thereof connected to a binding post 140 carried by the insulation and serving as an anchor for a spring 142 having a contact plate 144 at the upper end thereof, and said cable having the other lead thereof affixed, as by soldering, to the casing 100.

The back wall of the casing in conjunction with the insulation 136 defines a slot 146, and secured to the outer surface of the back wall of the casing, as by rivets 148, is a spring arm 149 carrying a detent 150 and a knob 152, said detent 150 extending into the slot 146 through an opening 154 in the casing.

The socket within the casing 100 is defined by a conductor strip 156 having ribs 158, said strip being secured to the insulation and having its ends in contact with end portions 160 of spring arms 162 and 164, each arm constituting a lateral portion of the socket having a rib 166, and said arms having oppositely directed forward portions 165 and 167, in overlying spaced relation, having ribs 168. The arms extend through oppositely disposed slots 170 in the casing 100 and are provided with ears 172.

A supporting arm 174 is adapted to be inserted within the slot 146 to force the detent 150 outwardly, said detent then becoming engaged with an aperture or niche, not shown in the arm 174, when said arm is inserted fully within the slot 146, to lock said arm in position in the slot. A reflector 176 having an opening 178 for a flash lamp is adapted to be adjustably mounted on the arm 174 by means of a slide fitting 180 and a set screw 182. A bracket 184 mounted on the reflector serves as a support for a sight 186 comprised of a viewing plate 188 having cross-hairs 180 and an arm 194 having a bead 196. The plate 188 and the arm 194 are pivotally carried by the bracket so that the sight may be collapsed when not in use.

The universal pivoting action of the casing 100 due to the rotatability of disk 72 and of the clutch case section 96 with respect to case section 94 has been above described. The sight 186 is used by the operator to accurately position the casing 100 and reflector 176 through the media of the clutch and disk mounting.

A flash lamp 198, shown in dotted outline in Fig. 3, having a threaded end 200 may be secured in the casing 100 by a pressing of the lamp against the contact plate 144 to compress the spring 142 while the lateral portions of the spring arms are displaced outwardly by a holding pressure applied to the ears 172 to move said ears toward the casing 100. When the lamp has been properly positioned within the socket, the holding force is released to allow the lateral portions of the arms 162 and 164 to move inwardly, whereupon the threaded end 200 of the lamp is engaged by the ribs, or semi-threads, 158, 166 and 168 to hold the lamp within the socket.

After the lamp is fired, it may be removed from the socket by a pressing of the ears 172 toward the casing to displace the lateral portions of the arms 162 and 164 outwardly, whereupon the lamp is ejected from the socket by the spring 142.

In order to accommodate midget flash lamps which are too small to be directly secured within the socket of the casing 100, an auxiliary socket 210 is provided, said socket being secured by a clamp 212 to a reflector mounting 214 having an arm 216 adapted to be inserted within the slot 146 in the casing 100. The reflector mounting has a web 218 secured to a reflector 220, said web having a tongue 222 struck therefrom provided with a detent 224, having an angularly inclined leading edge 225, extending into the socket 210 through one of two oppositely disposed notches 226 in said socket extending downwardly from the upper edge thereof. The socket 210 is provided with threads 228 and contains a core of insulating material 230. A contact pin 232 having a head 234 at each end thereof is carried by the core 230 for free reciprocal movement.

The socket 210 is secured in the casing 100 by inserting the arm 216 in the slot 146 and by engaging the threads 228 with the ribs 158, 166, and 168 of the arms 162 and 164. The lower head 234 of the pin 232 is then in contact with the plate 144. A midget lamp 236 having a pair of oppositely disposed nibs 238 is inserted within the upper end of the socket with the nibs 238 within the notches 226 to force the pin 232 downwardly against the action of spring 142. The reflector 220 may be bent to the right and downwardly to depress the web 218 and withdraw the detent 224 from the socket 210 to allow the insertion of the lamp, or the forcing action of the nib 238 against the angularly inclined edge 225 of the detent 224 may be utilized to force the detent 224 outwardly to allow insertion of the lamp. When the lamp has been inserted within the socket, the detent 224 springs back into the socket over the nib 238 to serve as a holding member for the retention of the lamp in the socket.

When the lamp 236 has been fired, it is removed from the socket 210 by springing the reflector 220 to the right, as viewed in Fig. 10, to depress the web 218, thus freeing the detent 224 from engagement with the nib 238 and allowing the spring 142 to force the pin 232 upwardly to eject the lamp from the socket 210.

A sight, similar to 186, but not shown, is provided for the reflector 220.

While the preferred embodiment of the invention has been shown and described, it is to be understood that the embodiment is subject to modification within the spirit of the invention and the scope of the appended claims.

What I claim as new and desire to secure by Letters Patent is:

1. A flash lamp mounting comprising a mounting ring member attachable to a supporting case, a disk member carried by said mounting ring member for relative rotation therewith in one plane, means carried by said disk member adapted in one position to fix said disk member against rotation with respect to said mounting ring member and adapted in another position to release said disk member for rotation, a lamp socket supported by said disk member and interconnected therewith through a pivotal connection, the elements of said connection being relatively movable with respect to each other in a plane normal to said first mentioned plane, a clutch element carried by each of the elements of said connection and adapted to coact to prevent relative movement between the elements of said connection, resilient means normally urging said clutch elements together and control means carried by said connection and movable transversely to said clutch elements to overcome said resilient means and separate said clutch elements to allow a pivotal action between the elements of said connection.

2. A flash lamp mounting comprising a mounting ring member attachable to a supporting case, a disk carried by said member for relative rotation therewith, means carried by said disk and adapted in one position of operation to prevent relative movement between said disk and member, pivotal connection between said disk and a lamp socket, clutch means associated with each of the elements of said connection normally maintained in pressing engagement by resilient means to prevent relative movement therebetween, and lever means carried by the connection and operable to separate said clutch means against the action of said resilient means to thereby enable the pivotal positioning of the lamp socket.

JOHN C. WHELAN.

REFERENCES CITED

The following references are of record in the file of this patent:

UNITED STATES PATENTS

| Number | Name | Date |
| --- | --- | --- |
| 1,486,896 | Hubbell | Mar. 18, 1924 |
| 1,934,902 | Wuelker | Nov. 14, 1933 |
| 2,110,131 | Auklam | Mar. 8, 1938 |
| 2,110,132 | Douglas | Mar. 8, 1938 |
| 2,261,953 | Brown | Nov. 11, 1941 |
| 2,290,793 | Alderman | July 21, 1942 |
| 2,293,660 | Nicolas | Aug. 18, 1942 |
| 2,314,033 | Curran | Mar. 16, 1943 |
| 2,371,479 | Steiner | Mar. 13, 1945 |
| 2,384,327 | Mendelsohn | Sept. 4, 1945 |
| 2,458,967 | Wiedenholft | Jan. 11, 1949 |
| 2,477,895 | Pollock | Aug. 2, 1949 |
| 2,478,545 | Pearce | Aug. 9, 1949 |
| 2,485,403 | Noel et al. | Oct. 18, 1949 |